(12) United States Patent
Wu (10) Patent No.: US 7,048,283 B2
(45) Date of Patent: May 23, 2006

(54) FOLDING STRUCTURE OF A FRONT WHEEL OF A GOLF CART

(75) Inventor: Fang-Li Wu, Tainan (TW)

(73) Assignee: Sports World Enterprise Co., Ltd., Tainan Hsien (TW)

( * ) Notice: Subject to any disclaimer, the term of this patent is extended or adjusted under 35 U.S.C. 154(b) by 231 days.

(21) Appl. No.: 10/847,591

(22) Filed: May 18, 2004

(65) Prior Publication Data

US 2005/0258611 A1    Nov. 24, 2005

(51) Int. Cl.
*B62D 61/06* (2006.01)

(52) U.S. Cl. .................. 280/38; 280/47.26; 280/DIG. 6

(58) Field of Classification Search ............. 280/47.26, 280/47.24, 47.34, DIG. 6, 62, 47.38, 642, 280/38, 654; 403/83, 368; 16/341
See application file for complete search history.

(56) References Cited

U.S. PATENT DOCUMENTS

| | | | |
|---|---|---|---|
| 6,698,789 B1 * | 3/2004 | Reimers et al. ............. | 280/651 |
| 6,719,319 B1 * | 4/2004 | Liao ............................ | 280/654 |
| 6,886,852 B1 * | 5/2005 | Cheng et al. ................ | 280/651 |
| 6,969,078 B1 * | 11/2005 | Liao ............................ | 280/38 |
| 6,974,150 B1 * | 12/2005 | Jane Santamaria .......... | 280/647 |

* cited by examiner

*Primary Examiner*—Christopher P. Ellis
*Assistant Examiner*—Christopher Bottorff
(74) *Attorney, Agent, or Firm*—Rosenberg, Klein & Lee (57) ABSTRACT

A golf cart has a locating block secured to a lower end of a main support rod thereof, a support member pivoted to the block to be angularly displaceable between a forwards stretched position and a rearwards folded one, and a front wheel supported on the support member; the support member has a control lever fitted thereto, and engaging elements movably fitted thereon, which will disengage the locating block for allowing the support member to be angularly displaced relative to the locating block as soon as the control lever is moved to an unlocking position; the engaging elements will engage the locating block to secure the support member in position as soon as the control lever is moved to a locking position after the front wheel has been moved to one of the folded and the stretched positions together with the support member.

6 Claims, 8 Drawing Sheets

FOLDING STRUCTURE OF A FRONT WHEEL OF A GOLF CART

BACKGROUND OF THE INVENTION

1. Field of the Invention

The present invention relates to a folding mechanism for a front wheel of a golf cart, more particularly one, with the help of which the front wheel can be folded to occupy less space for easy storage and transportation.

2. Brief Description of the Prior Art

Figure 1:
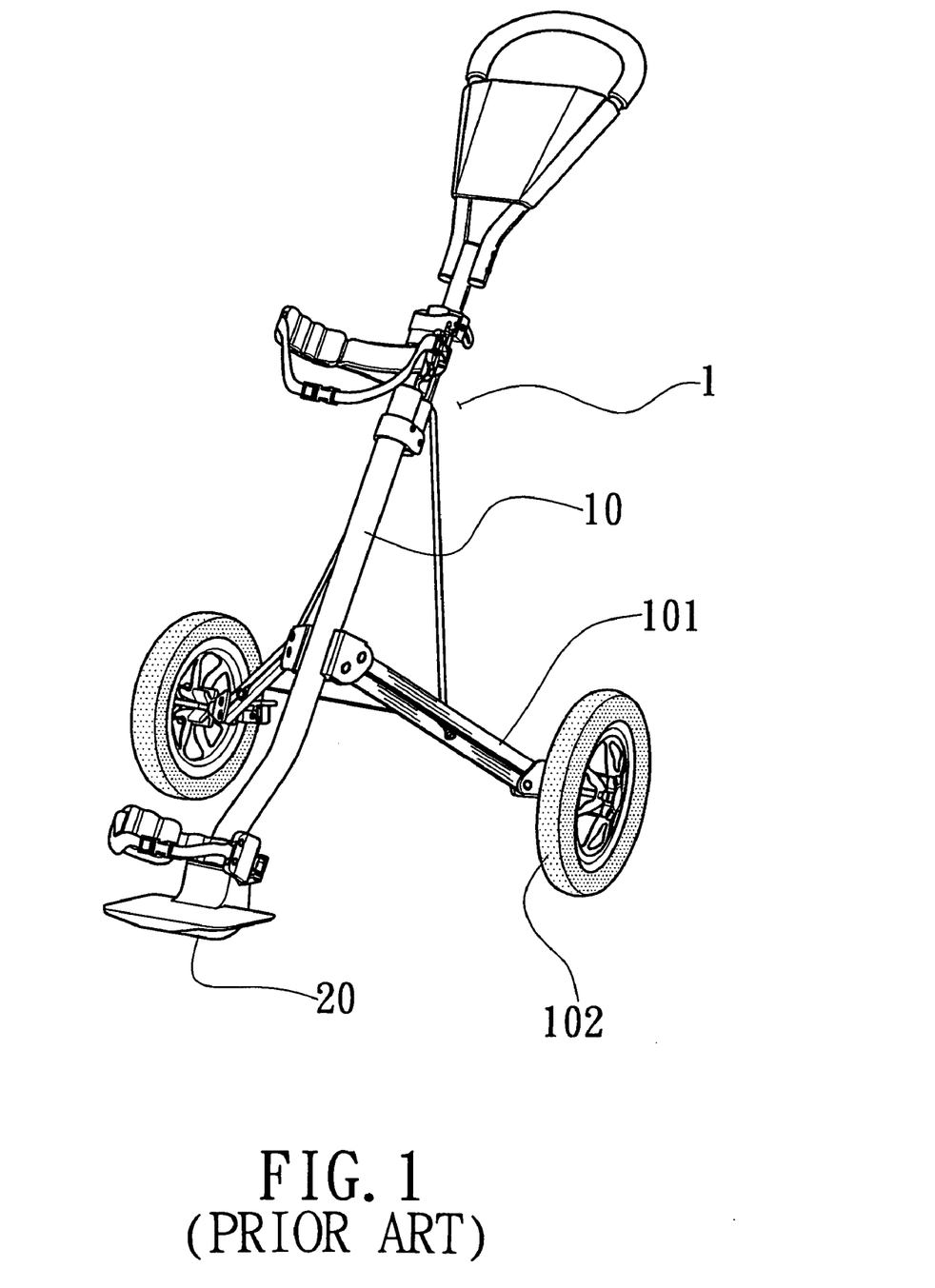
FIG. 1 is a perspective view of the first conventional golf cart in the Background.

Referring to FIG. 1, a conventional golf cart 1 includes a main support rod 10, two connecting rods 101 pivoted on the main support rod 10 at upper ends, wheels 102 supported on lower ends of the connecting rods 101, and a support unit 20 secured to a lower end of the main support rod 10 for holding a golf bag on. Because the golf bag will be very heavy when loaded with golf clubs, and the golf bag and all golf clubs are completely held on the support unit 20, which has no supporting means under it, it is difficult for the user to keep the golf cart in proper position when pushing the golf cart along. Therefore, the golf cart is inconvenient to use.

Figure 2:
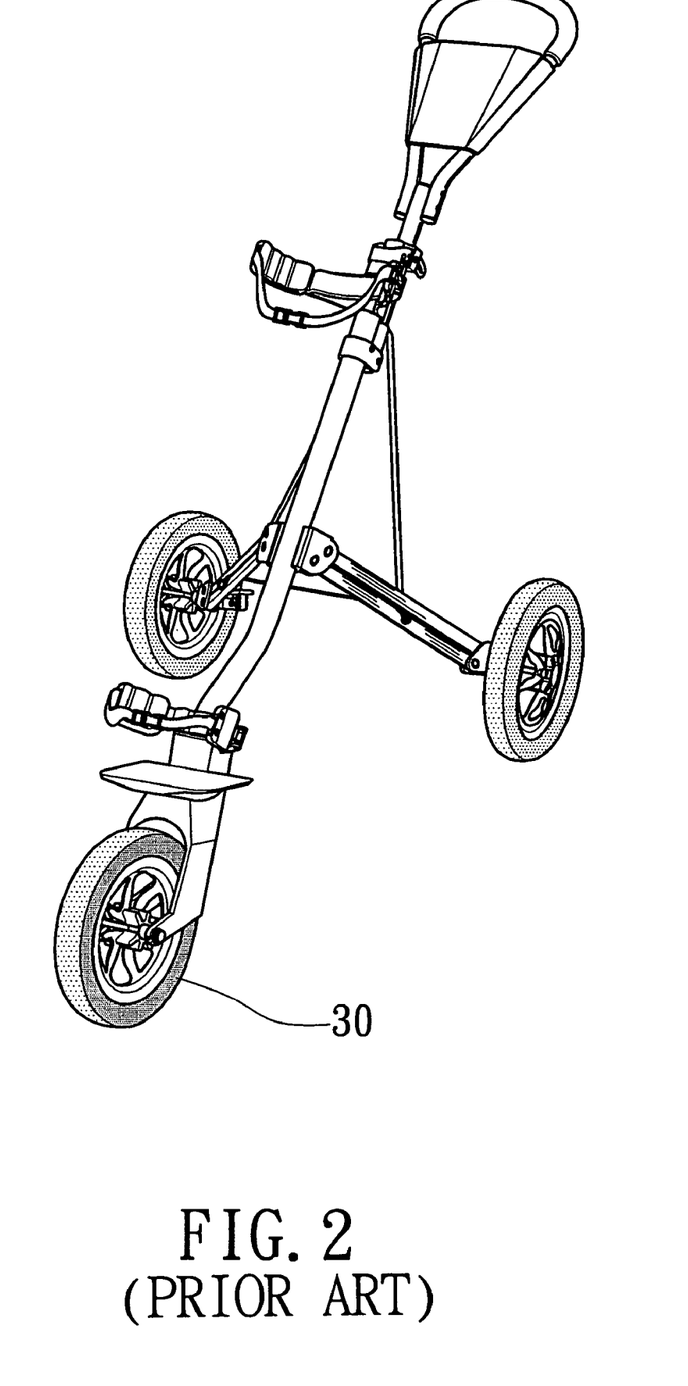
FIG. 2 is a perspective view of the second conventional golf cart.

Referring to FIG. 2, the above golf cart is further equipped with a front wheel 30 on a wheel support thereof, which is secured to a lower end of the main support rod right under the support unit, such that the above disadvantage is overcome. However, the front wheel 30 causes much increase to the length of the golf cart, and can't be folded for the golf cart to occupy less space in storage and transportation. Consequently, there will be inconvenience in storing and transporting the golf cart.

SUMMARY

It is a main object of the present invention to provide a folding mechanism of a front wheel of a golf cart such that the front wheel can be folded to occupy less space for easy storage and transportation.

The golf cart has a locating block secured to a lower end of a main support rod thereof, a support member pivoted to the block to be angularly displaceable between a forwards stretched position and a rearwards folded one, and a front wheel supported on the support member. The support member has a control lever fitted thereto, and engaging elements movably fitted thereon, which will engage the locating block to secure the support member to the locating block when the control lever is in a first position. The engaging elements will disengage the locating block for allowing the support member to be angularly displaced relative to the locating block as soon as the control lever is moved to a second position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 3:
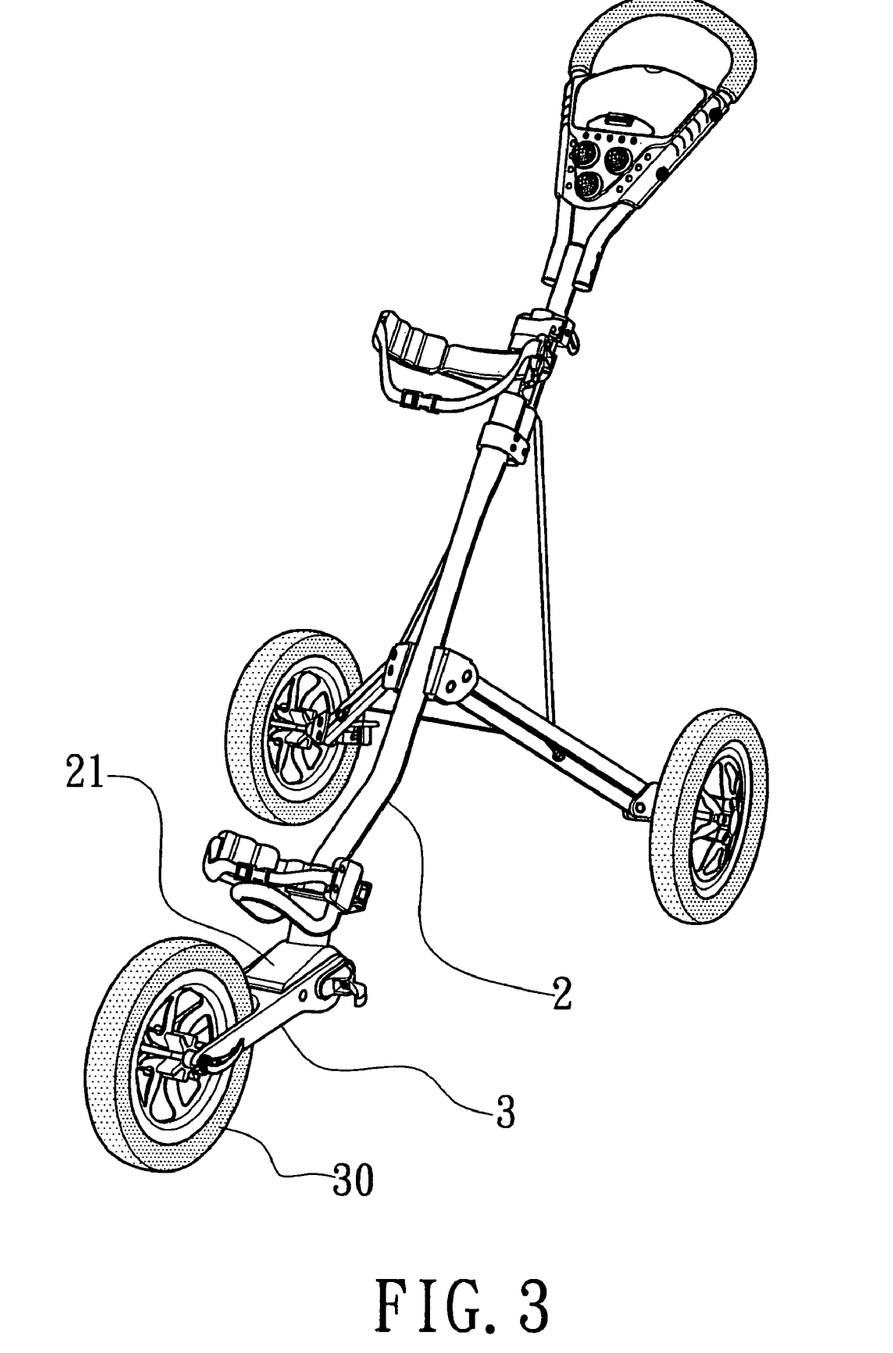
FIG. 3 is perspective view of the golf cart of the present invention.
Figure 4:
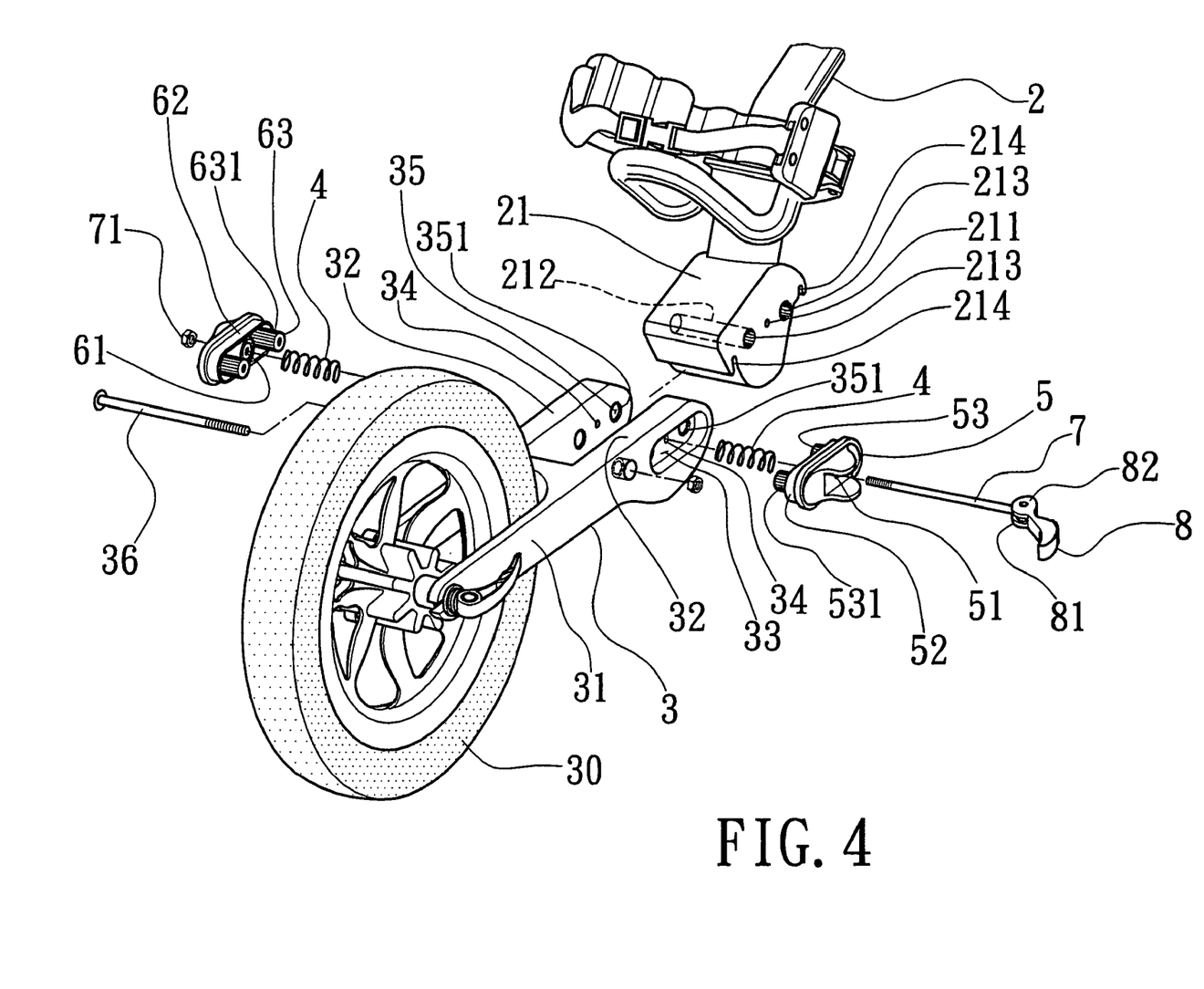
FIG. 4 is a partial exploded perspective view of the golf cart of the present invention.

Referring to FIGS. 3 and 4, a preferred embodiment of a folding mechanism for a front wheel 30 of a golf cart includes a locating block 21, a support member 3, left and right engaging elements 5 and 6, a connecting pivotal rod 7, and a control lever 8.

The locating block 21 is securely joined to a lower end of a main support rod 2 of the golf cart so as to be right under a holding unit, which is secured to the main support rod for holding a golf bag on. The locating block 21 has a transverse pivotal through hole 211 extending from a left side to a right side, and two transverse through holes 212, which are on two sides of, and equidistant to, the pivotal through hole 211. In addition, the locating block 21 is formed with corrugated surfaces 213 on those portions that define the transverse through holes 212. And, the locating block 21 has down facing hook portions 214, 214 at front and rear ends thereof.

The support member 3 has two spaced apart fitting portions 31 projecting forwards, and two spaced apart connecting portions 32 projecting rearwards. The front wheel 30 is arranged between, and supported on the fitting portions 31. Each of the connecting portions 32 has a holding recess 33 on a rear portion of an outward lateral side thereof, a transverse pivotal through hole 34, and two transverse through holes 35, which are on two sides of, and equidistant to, the pivotal through hole 34, and which through holes 34, and 35 are faced with the corresponding holding recesses 33 at outward ends thereof. And, the pivotal through holes 34 of the two connecting portions 32 are aligned with each other exactly. Furthermore, the connecting portions 32 are formed with corrugated surfaces 351 on those portions that define the through holes 35 thereof. And, a transverse rod 36 is secured to front portions of the connecting portions 32 at two ends.

Each of the left and the right engaging elements 5, 6 has a fitting projection portion 52, 62 on an inward side, a pivotal through hole 51, 61 extending from the fitting projection portion 52, 62 to an outward side thereof, and two posts 53, 53 (63, 63) on the fitting projection portion 52, 62, which are equidistant to the pivotal through hole 51 (61), and which are formed with corrugated portions 531, 531 (631, 631) on outer sides thereof.

The control lever 8 is pivoted to one end of the connecting pivotal rod 7 at a pivotal portion 81 thereof, and has both a concave portion (not numbered) and a projection portion 82, both of which are formed adjacent to the pivotal portion 81, and face opposite directions. In addition, the distance between the projection portion 82 and the pivotal portion 81 is longer than the distance between the concave portion and the pivotal portion 81. The control lever 8 further has an elongated handle portion 83, which is extended from the pivotal portion 81, and which is shaped according to ergonomics. The connecting pivotal rod 7 has a threaded portion at the other end.

In assembling the present folding mechanism, the connecting portions 32 of the support member 3 are respectively positioned on left and right sides of the locating block 21 with the two pivotal through holes 34 being aligned with the pivotal through holes 211. And, elastic elements 4, 4 are positioned in respective ones of the holding recesses 33 of the connecting portions 32, and aligned with respective pivotal through holes 34, and the left and the right engaging elements 5, 6 are fitted on respective ones of the holding recesses 33 at the fitting projection portions 52, 62 thereof so that the pivotal holes 51, 61 are aligned with the pivotal holes 34 of the connecting portions 32, and such that the posts 53, 53 (63, 63) are passed into respective ones of the through holes 35. Next, the connecting pivotal rod 7 is passed through all of the pivotal through holes 51, 34, 211, and 61, plus the elastic elements 4, 4, and connected with a nut 71 at the threaded portion thereof.

Figure 5:
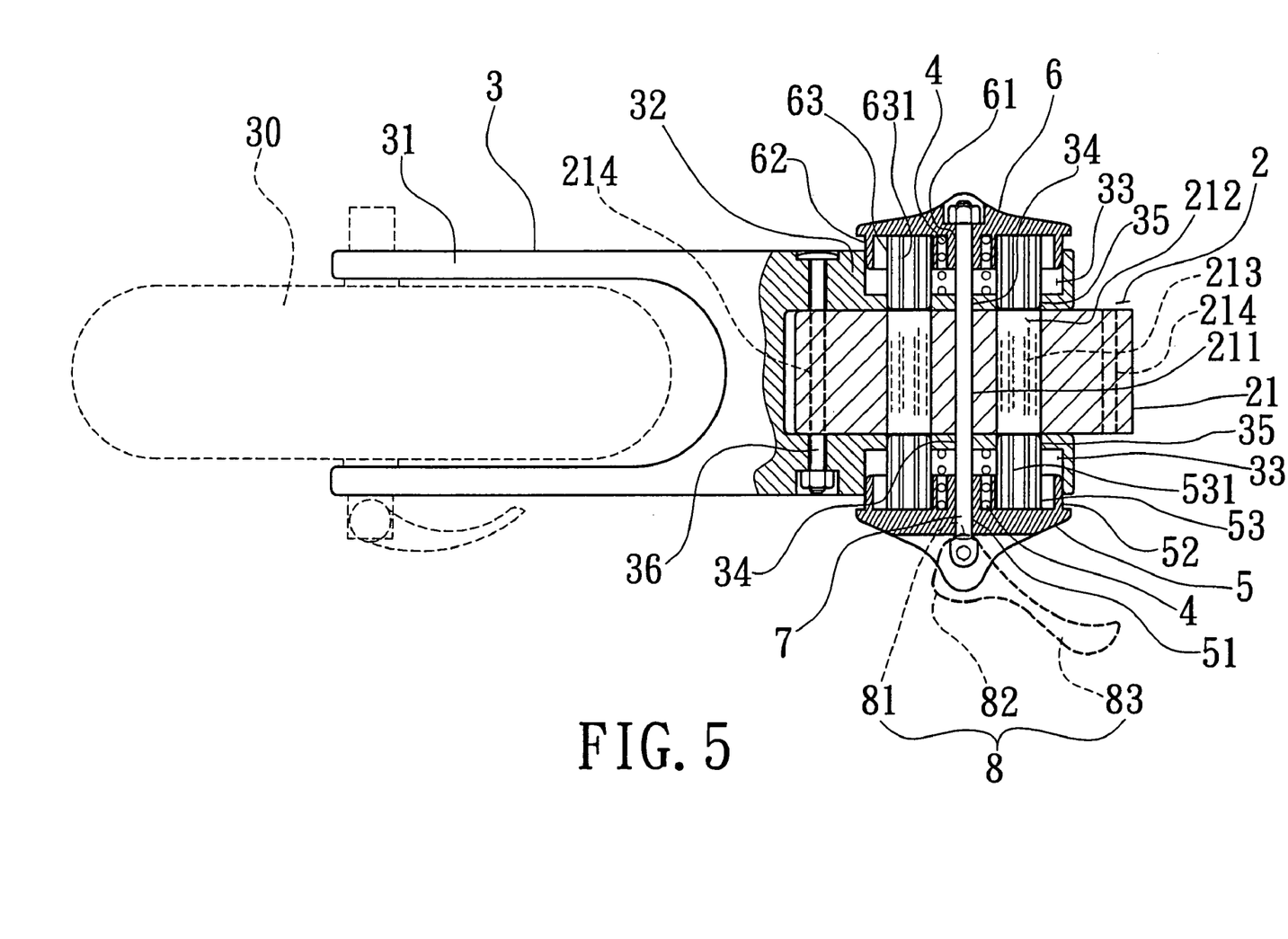
FIG. 5 is a horizontal section of the folding structure of the golf cart of the present invention, in the unlocked position.
Figure 7:
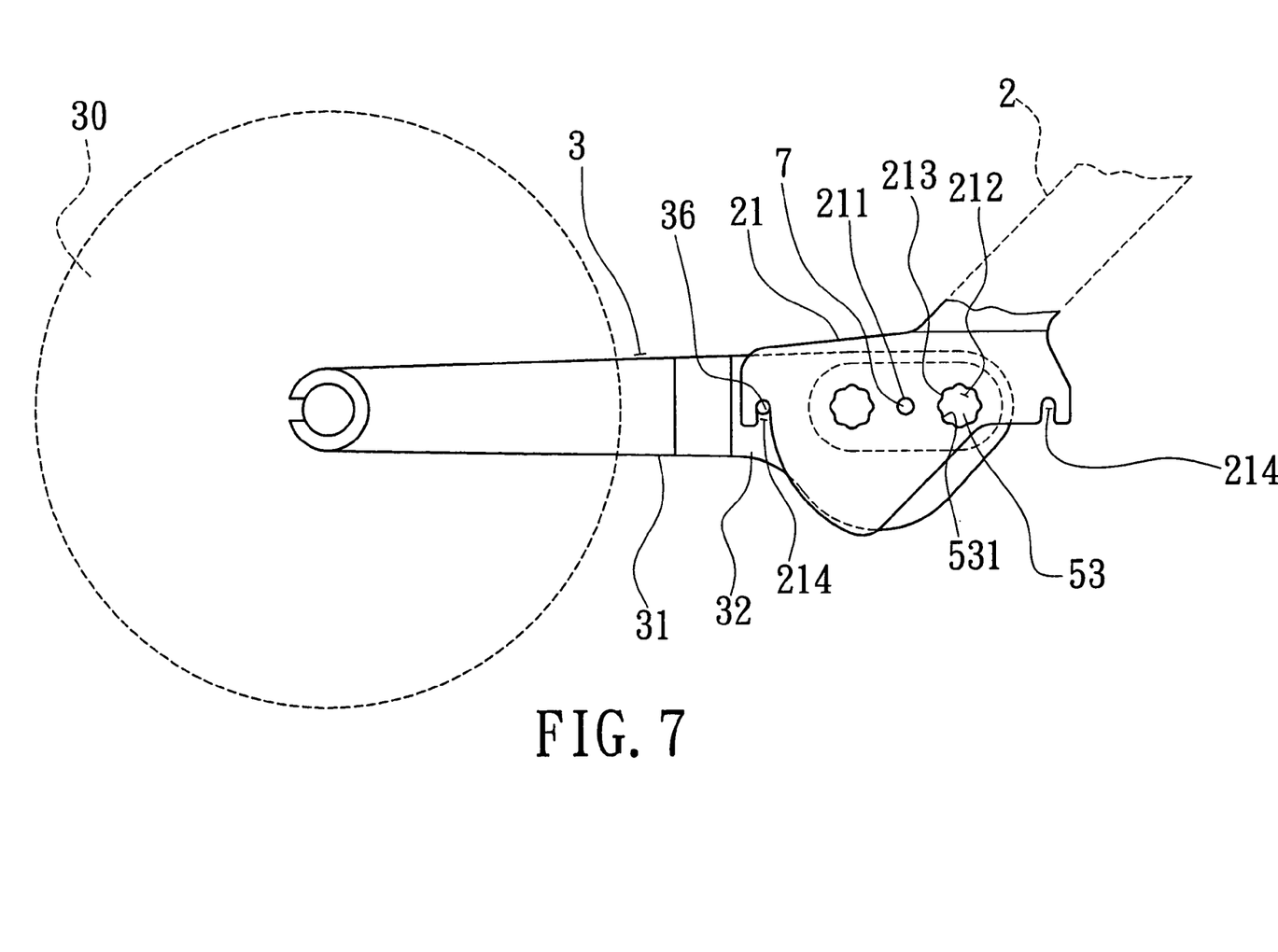
FIG. 7 is a partial side view of the golf cart of the present invention, with the front wheel being in the stretched position.
Figure 8:
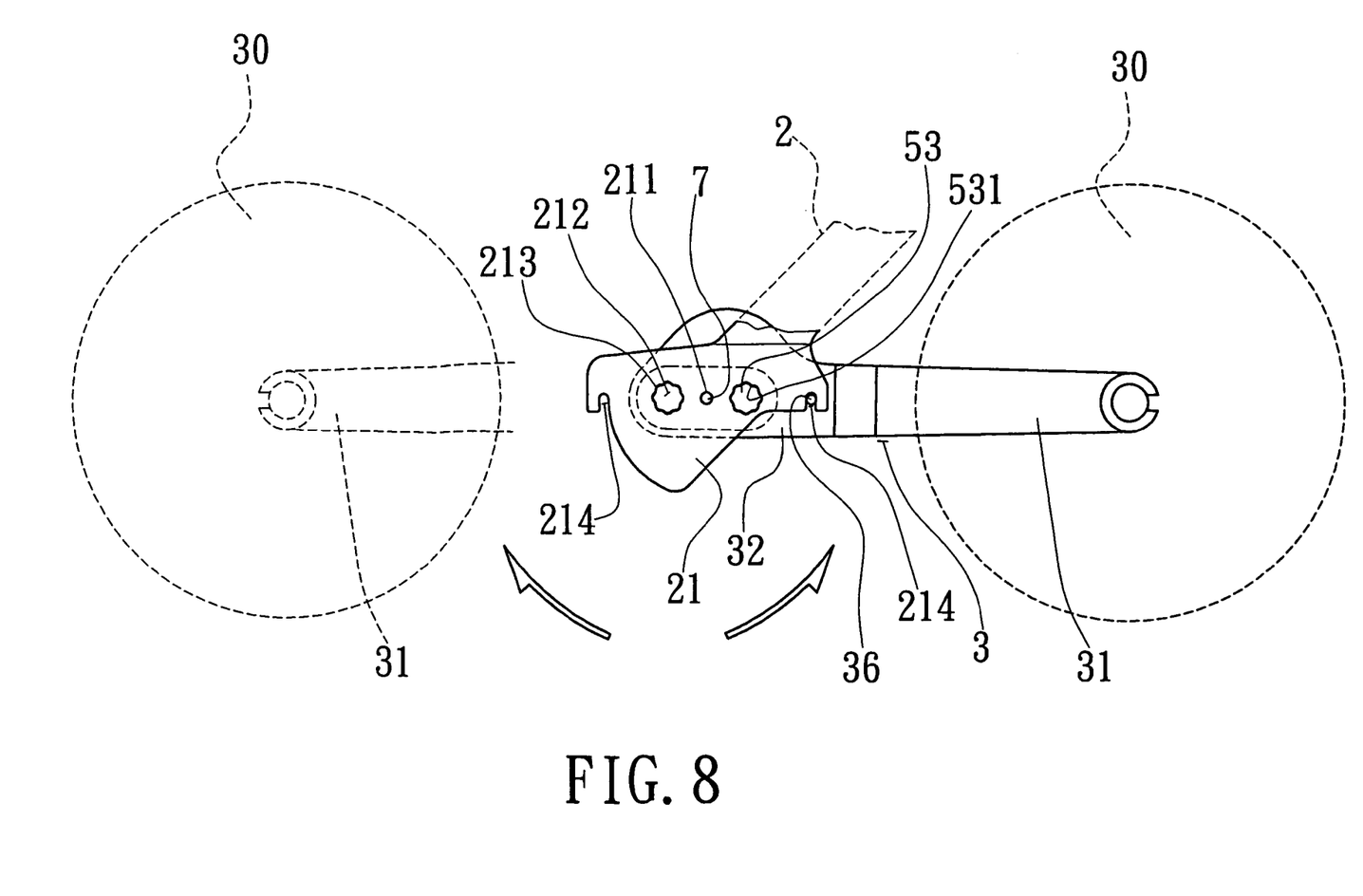
FIG. 8 is a partial side view of the golf cart of the present invention, with the front wheel being in the folded position.

Thus, the engaging elements 5 and 6 can't be separated from or angularly displaced relative to the support member 3, and the support member 3 is pivoted on the pivotal rod 7 to be angularly displaceable relative to the locating block 21. And, when the control lever 8 is pivoted to such position as to contact the left engaging element 5 at the concave portion thereof as shown in FIG. 5, the elastic elements 4 will bias the engaging elements 5 and 6 outwardly of the holding recesses 33, 33 with their elastic force, and in turns, the posts 53 and 63 of the engaging elements 5 and 6 will be outside the respective ones of the through holes 212 of the locating block 21, not engaging the locating block 21; thus, the support member 3 is allowed to be pivoted on the locating block 21 from a forwards stretched position (FIG. 7) to a rearwards folded position (FIG. 8), and vice versa; when the posts 5 and 6 are held in the through holes 35, the corrugated portions 531, 631 will be engaged with the corrugated surfaces 351, which define the through holes 35 of the support member 3, as shown in FIG. 5. The transverse rod 36 will be engaged with the front one of the hook portions 214 of the locating block 21 as soon as the support member 3 is pivoted to the forwards stretched position, as shown in FIG. 7. And, the transverse rod 36 will be engaged with the rear one of the hook portions 214 as soon as the support member 3 is pivoted to the rearwards folded position, as shown in FIG. 8.

Figure 6:
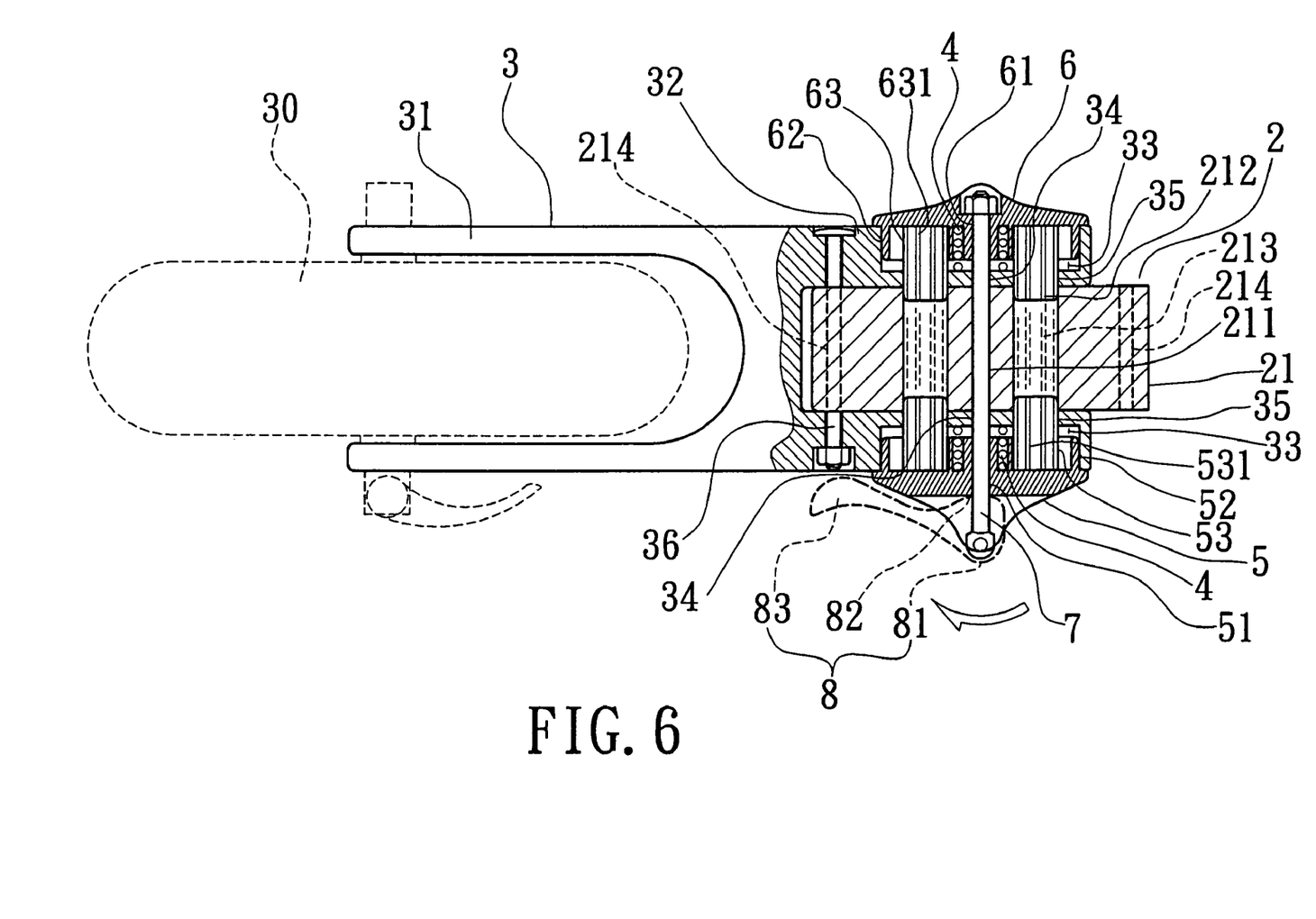
FIG. 6 is a horizontal section of the folding structure of the golf cart of the present invention, in the secured position.

Referring to FIG. 6, the engaging elements 5 and 6 will engage the locating block 21 with the posts 53, 63 thereof being passed into the through holes 212 of the locating block 21 as soon as the control lever 8 is pivoted to such position as to contact the left engaging element 5 at the projection portion 82 thereof after the support member 3 has been pivoted to any one of the stretched and the folded positions; when the posts 5 and 6 are held in the through holes 212, the corrugated portions 531, 631 thereof will engage the corrugated surfaces 213, which define the through holes 212 of the locating block 21.

In other words, to stretch the front wheel 30, the user only has to first pivot the control lever 8 so as to make the concavely curved portion of the lever 8 contact the left engaging element 5, and then pivot the support member 3 forwards until the transverse rod 36 is engaged with, and stopped by the front one of the hook portions 214, and finally pivot the control lever 8 so as to make the projection portion 82 of the lever 8 contact the left engaging element 5. And, to fold the front wheel 30, the user only has to first pivot the control lever 8 so as to make the concavely curved portion of the lever 8 contact the left engaging element 5, and then pivot the support member 3 forwards until the transverse rod 36 is engaged with, and stopped by the rear one of the hook portions 214, and finally pivot the control lever 8 so as to make the projection portion 82 of the lever 8 contact the left engaging element 5.

From the above description, it can be easily understood that because of the present folding mechanism, the front wheel 30 of the golf cart can be moved to, and secured in the rearward folded position for the golf cart to occupy less space in storage and transportation, and the front wheel 30 can be easily and smoothly moved between the folded and the stretched positions. In other words, the folding mechanism is convenient to use.

What is claimed is:

1. A folding mechanism for a front wheel of a golf cart, comprising a locating block secured to a lower end of a main support rod of a golf cart; the locating block having a transverse pivotal hole extending from a left side to a right side, and two transverse through holes on two sides of, and equidistant to, the pivotal hole thereof;

a support member whose front end has a front wheel of the golf cart supported on; the support member having two spaced apart connecting portions projecting rearwards; each of the connecting portions having a transverse pivotal hole adjacent to, and aligned with the pivotal hole of the locating block; each of the connecting portions having two transverse through holes on two sides of, and equidistant to, the pivotal hole thereof;

left and right engaging elements movably fitted on respective ones of outward lateral sides of the connecting portions of the support member for releaseably securing the support member to the locating block; each of the left and the right engaging elements having a pivotal hole aligned with the pivotal holes of the connecting portions of the support member; each of the engaging elements having two posts passed into respective ones of the through holes of the connecting portions;

a connecting pivotal rod passed through the pivotal holes of the engaging elements, the locating block, and the connecting portions; the pivotal rod having a first end projecting from the left engaging element, and being screwed to a nut at a second threaded end; and a control lever pivoted to the first end of the pivotal rod at a pivotal portion thereof; the control lever having a concavely curved portion and a projection portion, both of which are adjacent to the pivotal portion, and face opposite directions; a distance between the projection portion and the pivotal portion is longer than a distance between the concavely curved portion and the pivotal portion;

whereby as soon as the control lever is pivoted to such position as to contact the left engaging element at the concave portion, the posts of the engaging elements will be outside the respective ones of the through holes of the locating block to disengage the locating block, thus allowing the support member to be angularly displaced relative to the locating block from a forwards stretched position to a rearwards folded position, and from the rearwards folded position to the forwards stretched position; and whereby as soon as the control lever is pivoted to such position as to contact the left engaging element at the projection portion thereof after the support member has been pivoted to one of the stretched and the folded positions, the engaging elements will engage the locating block with the posts thereof being passed into the through holes of the locating block, thus securing the support member to the locating block.

2. The folding mechanism as claimed in claim 1, wherein the locating block is formed with corrugated surfaces on those portions that define the transverse through holes thereof, the connecting portions of the support member are formed with corrugated surfaces on those portions that define the through holes thereof, and the posts of the engaging elements are formed with corrugated portions on outer sides thereof, which can engage the above corrugated surfaces.

3. The folding mechanism as claimed in claim 1, wherein the locating block has a down facing hook portion at a front end thereof, and the support member has a transverse rod, which are secured to front portions of the connecting portions at two ends thereof; the transverse rod being capable of engaging the front hook portion as soon as the support member is pivoted to the forwards stretched position.

4. The folding mechanism as claimed in claim 3, wherein the locating block has a down facing hook portion at a rear end thereof; the transverse rod being capable of engaging the rear hook portion as soon as the support member is pivoted to the rearwards folded position.

5. The folding mechanism as claimed in claim 1, wherein each of the connecting portions of the support member has a holding recess on an outward lateral side thereof for holding a respective one of the engaging elements in.

6. The folding mechanism as claimed in claim 1, wherein elastic elements are positioned between the left engaging element and the corresponding connecting portion, and between the right engaging element and the corresponding connecting portion such that the engaging elements will be biased outwards and away from the through holes of the locating block, and the posts thereof disengaged from the locating block as soon as the control lever is pivoted to such position as to contact the left engaging element at the concave portion thereof.

* * * * *